United States Patent [19]

Turco

[11] 4,129,866
[45] Dec. 12, 1978

[54] METHOD OF SCANNING A RADAR ANTENNA TO EFFECT IMPROVED RADAR OPERATION

[76] Inventor: Joseph Turco, 412 Edgewood Dr., Ambler, Pa. 19002

[21] Appl. No.: 779,681

[22] Filed: Mar. 21, 1977

[51] Int. Cl.² .............................................. G01S 9/00
[52] U.S. Cl. .................................................. 343/5 R
[58] Field of Search ............ 343/5 R, 100 AD, 7 TA, 343/758

[56] References Cited

U.S. PATENT DOCUMENTS

| 2,737,853 | 3/1956 | Gravenhorst et al. ............... 343/5 R |
| 3,680,094 | 7/1972 | Bayle et al. ........................... 343/5 R |
| 3,893,123 | 7/1975 | Bieser ................................... 343/758 |
| 4,039,782 | 8/1977 | Burckhardt et al. ............ 343/7 VM |

Primary Examiner—Maynard R. Wilbur
Assistant Examiner—Lawrence Goodwin
Attorney, Agent, or Firm—Robert J. Mooney

[57] ABSTRACT

In one implementation of the inventive method an aircraft with an antenna mounted thereon is compelled to follow a sinuous path. The antenna normally provide 120° coverage on either side of the aircraft. Full 360° coverage is provided by the same antenna as the aircraft traverses the predetermined sinuous path.

2 Claims, 5 Drawing Figures

METHOD OF SCANNING A RADAR ANTENNA TO EFFECT IMPROVED RADAR OPERATION

BACKGROUND OF INVENTION

This invention relates to steerable antenna systems and finds particular application in aircraft mounted antenna systems.

Known methods of antenna scanning employ means to electronically control the beam position of an antenna that is physically fixed to a platform, or rely on mechanically moving an antenna that has an associated beam direction, or employ means to effect beam direction by controlling the antenna feed, or imposing one type of control through one axis of movement (such as azimuth) and another control on a second axis of movement (such as elevation). These known methods do provide flexibility and desirable system operation but they can not provide the improvements associated with this invention.

SUMMARY OF INVENTION

The purpose of this invention is to control a radar antenna and its associated platform in such manner that the antenna pointing direction is affected by both the usually employed antenna pointing mechanism and an additional mechanism associated with the antenna platform. The resulting radar instrumentation can then provide either faster antenna scanning motion or more angular coverage of the antenna beam or both.

In one particular implementation of the inventive method set forth herein a large dorsal fin antenna is mounted upon the top of an aircraft. Normally this type of antenna effects a beam coverage of 120° on each side of the aircraft leaving the fore and aft cones of 60° without beam coverage. By compelling the aircraft to maneuver according to a predetermined sinuous pattern, full 360° beam coverage is attained.

OBJECT OF THE INVENTION

Accordingly it is an object of this invention to improve the beam coverage of vehicle mounted antenna systems without incurring structural detriments such as increased wind resistance. It is further object of this invention to provide a method of scanning which facilitates and enhances increased scanning motion, scanning rates and beam coverage.

Other objects, advantages and novel features of the invention will become apparent from the following description when considered in conjuction with the accompanying drawings.

DESCRIPTION OF THE PREFERRED EMBODIMENT

This invention consists of combining two methods of controlling a radar beam direction to effect more desirable antenna beam control. The first method of beam control is associated with the normal way of controlling the antenna beam. This is usually done in one or more of the following ways: Electronic control (through frequency or phase control) of the beam through a scan angle from a specific reference angle; mechanical movement of the antenna structure through the physical movement of a specific structure such as reflector, feed, or other part of the radar structure; or movement of the platform on which the antenna structure is located.

None of these methods alone produces the desirable results that can be made available through the application of this invention. This invention has application to any platform on which is mounted an antenna structure but it has a most direct application to a vehicle on which it is desirable to minimize the aerodynamic penalties of having a radar structure on board the vehicle. Hence, the best use of this invention is in conjunction with an aircraft having a relatively large dorsal fin antenna fixedly mounted to the aircraft and protruding upwardly therefrom.

Figure 1:
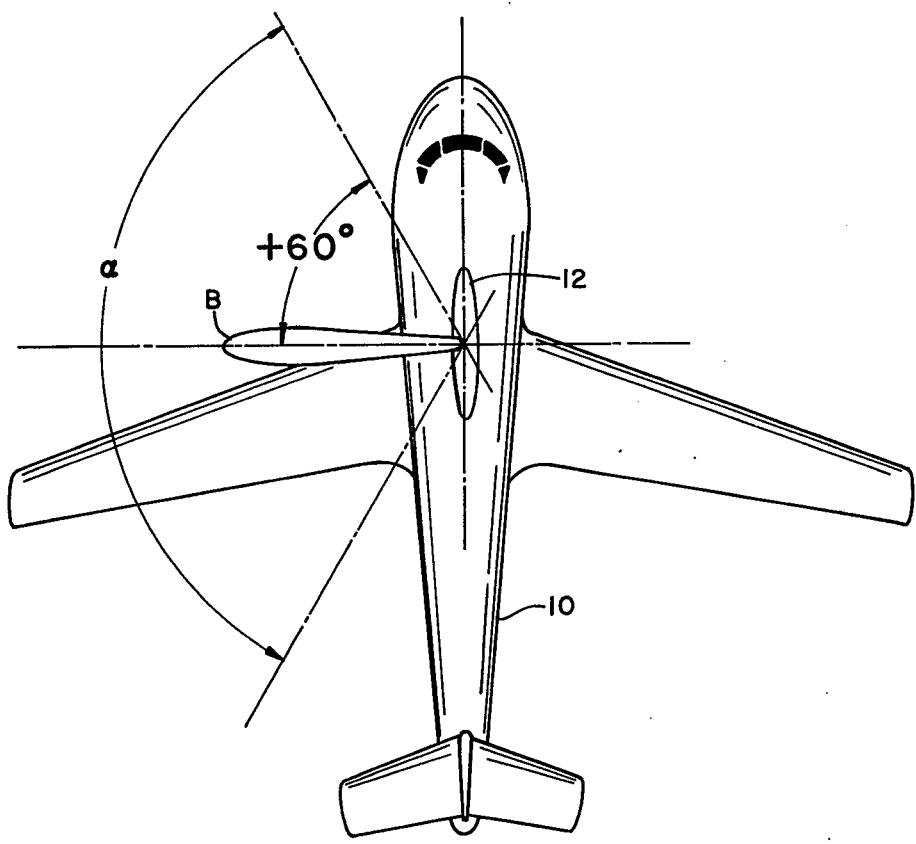
FIG. 1 is a top view of an aircraft having a dorsal fin antenna fixedly mounted thereon and illustrates a typical antenna beam pattern and search angle.

Consider an aircraft 10, as depicted in FIG. 1 which has a large upwardly protruding dorsal fin antenna 12 to which provides a large power to aperture ratio value for application to long range radar surveillance. It is most desirable to obtain as large an azimuth coverage as possible without penalizing the aircraft's 10 aerodynamic performance. Hence, it is most desirable not to face the antenna structure 12 directly into the wind. The antenna structure 12 can be either inside the aircraft 10 or outside the aircraft 10 as shown in FIG. 1. Further, the antenna 12 can be either single faced to look only on one side or double faced to view both sides of the aircraft. Hence, the structure shown in FIG. 1 is a typical configuration. This configuration, without the application of this invention, can not very well search the fore and aft directions in a timely manner. FIG. 1 depicts a reasonable aircraft/antenna combination that would reasonably provide a surveillance angle, $\alpha$, of 120° on each side of the aircraft ($\pm$ 60° from broadside), but which would provide little capability for the cones 60° fore and aft of the aircraft 10.

The antenna angle coverage, $\alpha$, as shown in FIG. 1, in concert with a physical aircraft movement, which is defined herein as the Turco maneuver, can provide coverage of these fore and aft 60° cones and can provide such coverage with an antenna gain as good as that at the extreme of the normal broadside coverage depicted in FIG. 1 and can do so in a timely manner depending upon aircraft maneuverability.

Figure 2:
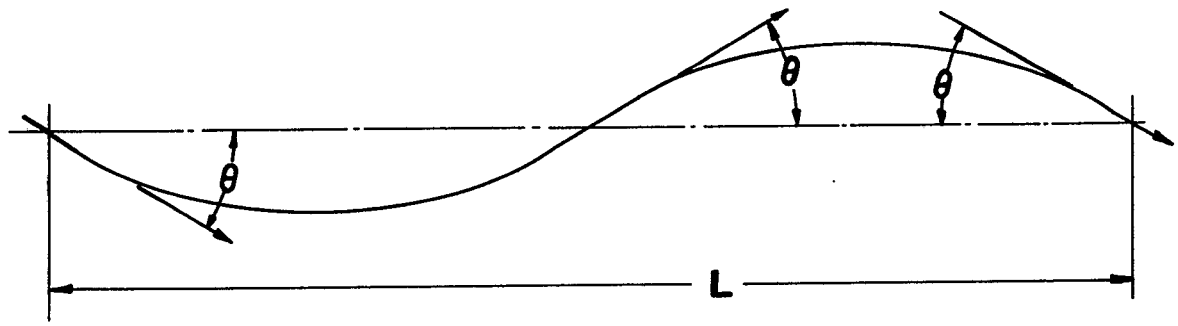
FIG. 2 is an illustrative diagram of a typical predetermined aircraft path which is constructed according to this invention.

The Turco maneuver is depicted in FIG. 2, "$\theta$" is defined as the maneuver angle. "L" is defined as the path length of the maneuver. These values are selected on the basis of the angle coverage desired, the antenna gain loss that can be tolerated in the system application, the time of scan desired, and the maneuverability of the aircraft system.

The combination of the antenna scan coverage depicted in FIG. 1, i.e. a value of $\pm 60°$ from broadside, and the Turco maneuver depicted in FIG. 2, i.e. where $\theta$ equals $\pm 30°$, can provide the required full valued scan angle, i.e. a value of 180°, in the time it takes to maneuver the aircraft from the maneuver angle of $+30°$ to the maneuver angle of $-30°$. This time can be controlled as desired within the constraints of the aircraft system capability and can be designed for less than 20 seconds if desired.

Figure 3C:
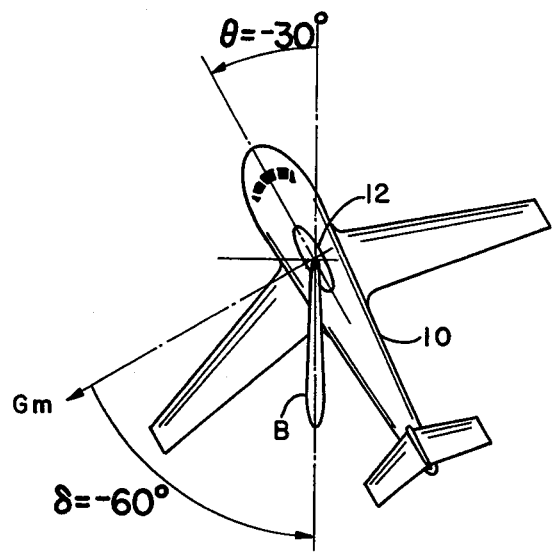
FIGS. 3a, 3b, 3c, illustrate the enhanced beam coverage obtainable with the antenna shown in FIG. 1 when the aircraft is compelled to maneuver according to the predetermined path shown in FIG. 2.
Figure 3B:
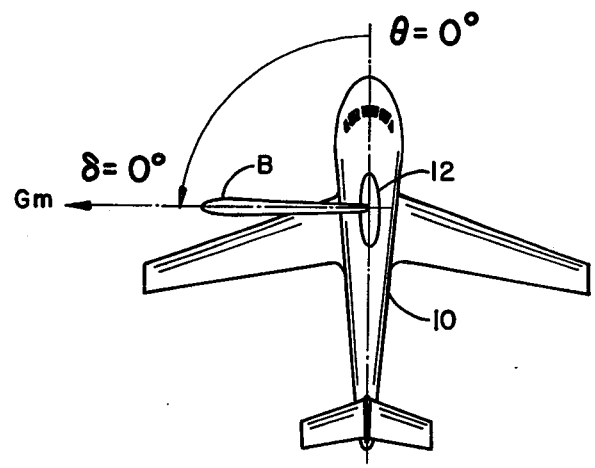
Figure 3A:
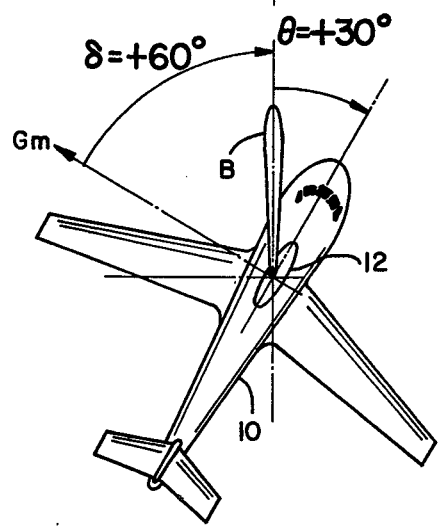

FIGS. 3a, 3b, and 3c depict the affect of combining the Turco maneuver as depicted in FIG. 2 and the normal scan coverage, α, of an antenna 12 as depicted in FIG. 1. As depicted in FIG. 3a, the maneuver angle, θ, is +30° (to the right of the average heading of the aircraft) and the antenna scan angle, δ, is +60° (also to the right) from the maximum gain direction, Gm, of the antenna structure 12 for the antenna looking to the left of the aircraft. For this configuration and for the angles selected as an example, the antenna beam, B, will have a direction of dead ahead, which is defined as the average heading of the aircraft 10.

Since the aircraft 10 will be performing the Turco maneuver, at some time later the situation will be as depicted in FIG. 3b. The conditions now are as follows: The maneuver angle θ is now reduced from +30° to 0°; the antenna scan angle, δ, has been changed from +60° to 0°, i.e. broadside of the antenna; the antenna is now pointing in its maximum gain direction Gm; the antenna is now pointing at 90° to the left of the average heading of the aircraft; and the Turco scan has covered an azimuth angle of 90°.

Some time later, the situation of FIG. 3c will obtain. The conditions now are as follows: The maneuver angle θ is changed from 0° to −30°; the antenna scan angle, δ, has been changed fro 0° to −60° broadside of the antenna; the antenna is now pointing at 180° to the left of the average heading of the aircraft 10; the antenna 12 is pointing toward the average dead aft position; and the Turco scan has covered an azimuth angle of 180°.

Hence, the Turco scan has effected an azimuth coverage of 180° starting from dead ahead and terminating at dead aft by combining and coordinating the scan capability of an antenna with the scan capability of a platform. The 180° coverage to the right of the aircraft 10 can be obtained simultaneously with the coverage as described above with a second antenna pointed to the right of the aircraft either during the maneuver as described above or during the subsequent maneuver from −30° to +30°.

The path, L, shown in FIG. 2 is described as $\theta = A \sin mt$ and the scan angle of the radar shown in FIGS. 3a, 3b and 3c is described as $\delta = \Delta \sin mt$. "A" is the maximum excursion from the average heading of the aircraft, Δ is the maximum scan angle and "m" is a predetermined arbitrary constant.

The description above typifies the application of the invention. The actual mechanization can provide any type of antenna scan in concert with any type of platform movement to effect the combined scans. Other refinements that can be used are as follows: the antenna scan start can be effected at any angle and the antenna scan rate can be any desired rate as the system may dictate.

The advantages and new features provided by the invention are as follows: Data rates (scan rates) less than 10 seconds can easily be accomplished; 360° scans (and less) can be effected at these fast data rates; and more radar dwell time can be obtained by use of a specially programmed scan pattern.

I claim:

1. A method of enhancing the scan capability of a radar afixed to an aircraft comprising:
    compelling the aircraft to follow a predetermined sinusoidal path; and
    synchronizing the scan angle of the radar to the predetermined path to at least assure that the radar looks in a first direction along the average heading of the aircraft when the aircraft is pointing a predetermined angle to the right of its average heading and to at least assure that the radar looks in a second direction, opposite to the first direction, along the average heading of the aircraft when the aircraft is pointing a predetermined angle to the left of its average heading.

2. A method according to claim 1 wherein the predetermined sinusoidal path is described as $\theta = A \sin m t$ and the scan angle of the radar is described as $\delta = \Delta \sin m t$ where A is the maximum excursion from the average heading of the aircraft, Δ is the maximum scan angle and m is a predetermined arbitrary constant.

* * * * *